United States Patent
Li et al.

(10) Patent No.: US 12,498,904 B2
(45) Date of Patent: Dec. 16, 2025

(54) AUTOMATED KNOWLEDGE GRAPH BASED REGRESSION SCOPE IDENTIFICATION

(71) Applicant: International Business Machines Corporation, Armonk, NY (US)

(72) Inventors: Yuan Li, Ningbo (CN); Chao Yu, Ningbo (CN); Shen Qi, Ningbo (CN); Tao Liu, Leander, TX (US); Qiang He, Ningbo (CN); Nuo Xu, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 17/700,905

(22) Filed: Mar. 22, 2022

(65) Prior Publication Data

US 2023/0305815 A1    Sep. 28, 2023

(51) Int. Cl.
*G06F 8/30* (2018.01)

(52) U.S. Cl.
CPC ..................... *G06F 8/30* (2013.01)

(58) Field of Classification Search
CPC ............................................. G06F 8/30
USPC ............................................. 717/106
See application file for complete search history.

(56) References Cited

U.S. PATENT DOCUMENTS 9,317,404 B1 *  4/2016  Cohen et al. ............. G06F 8/30
11,106,572 B2 *  8/2021  Durairaj ............. G06F 11/3692
2019/0005163 A1 *  1/2019  Farrell ................ G06F 16/9024
2020/0301675 A1 *  9/2020  Anicic ...................... G06F 8/34
2022/0223246 A1 *  7/2022  Boothroyd ............. G16H 10/40
2023/0281369 A1 *  9/2023  Eavy ...................... G06N 3/042

FOREIGN PATENT DOCUMENTS

CN    103699488 B    1/2017
CN    105302710 B    6/2019
EP    3859564 A2 *    8/2021    ............. G06N 5/022

OTHER PUBLICATIONS

Ke, "Interpretable Test Case Recommendation based on Knowledge Graph", 2020, IEEE (Year: 2020).*

(Continued)

*Primary Examiner* — Hossain M Morshed
(74) *Attorney, Agent, or Firm* — Harrity & Harrity, LLP

(57) ABSTRACT

Mechanisms are provided to automatically identify a regression scope of a requirements specification for at least one functionality of a software product. A first knowledge graph, having function entities, is generated of the requirements specification specifying functional requirements for a software product and a first vector representation is generated for the function entities. Code entities for existing code for the software product are generated that comprise features associated with portions of the existing code, and a second vector representation is generated for these code entities. Code entities are linked to function entities based on a vector similarity analysis between the first vector representation and the second vector representation. A regression scope knowledge graph output is generated, based on the linked code entities and function entities, that depicts relationships between function entities corresponding to the functional requirements with code entities corresponding to portions of existing code for the software product.

20 Claims, 8 Drawing Sheets

(56) References Cited

OTHER PUBLICATIONS

Anonymous, "A Method for Automatic Software Code Regression Detection and Remediation in Microservices Architectures", IP.com Prior Art Database Technical Disclosure, IP.com No. IPCOM000262314D, May 19, 2020, 3 pages.

Anonymous, "Method to reduce the risk of regression associated to a set of changes in software code based on repository items suggestions", IP.com Prior Art Database Technical Disclosure, IP.com No. IPCOM000259196D, Jul. 19, 2019, 4 pages.

Microstrong. "A simple analysis of the principles of Word2Vec", retrieved from web https://zhuanlan.zhihu.com/p/114538417, Feb. 13, 2021, 21 pages.

Pengyu Li. "A simple understanding of the PageRank algorithm", retrieved from web https://zhuanlan.zhihu.com/p/81691075, Dec. 27, 2021, 7 pages.

User 7592569. "Common methods for calculating similarity between vectors", retrieved from web https://cloud.tencent.com/developer/article/1668762, Jul. 27, 2020, 9 pages.

Yhangf. "Word2Vec algorithm review", retrieved from web https://zhuanlan.zhihu.com/p/58290018, May 16, 2022, 7 pages.

* cited by examiner

AUTOMATED KNOWLEDGE GRAPH BASED REGRESSION SCOPE IDENTIFICATION

BACKGROUND

The present application relates generally to an improved data processing apparatus and method and more specifically to mechanisms for automatically generating knowledge graph representations of requirements and code elements and determining a regression scope based on knowledge graph and similarity analysis.

When new requirements for software are promulgated by an organization for fixes to existing software or implementation of new features in existing software, it is important for development teams to be able to determine the impact that such requirements will have on the existing software and/or other software that the existing software interfaces with. That is, a developer needs to know if they make a change to a portion of code in an existing software product, what other portions of that software product and other software products may be affected by the change in the portion of code. This is especially true in the modern micro-services domain.

Micro-services is an architectural approach to building software applications in which the software application is a combination of core functions provided as separate services which are then loosely coupled together, and independently run, to provide an overall functionality of the software application. With a micro-services approach to building software applications different development teams may be involved in developing each of the individual services and may not know how their efforts will impact other services or the efforts of other development teams. Thus, knowing how changes to existing software products, such as a microservice, will affect other portions of the same software product or other software products, such as other microservices, is of significant importance to development teams.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided that comprises generating a first knowledge graph of a received requirements specification data structure specifying functional requirements for a software product. The method also comprises generating, for function entities specified in the first knowledge graph, a first vector representation. Moreover, the method comprises generating one or more code entities for existing code for the software product, wherein the code entities comprise features associated with portions of the existing code, and generating, for the one or more code entities, a second vector representation. The method also comprises linking selected code entities in the one or more code entities to selected function entities based on a vector similarity analysis between the first vector representation and the second vector representation. In addition, the method comprises generating a regression scope knowledge graph output based on the linked code entities and function entities, wherein the regression scope knowledge graph depicts relationships between function entities corresponding to the functional requirements with code entities corresponding to portions of existing code for the software product.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
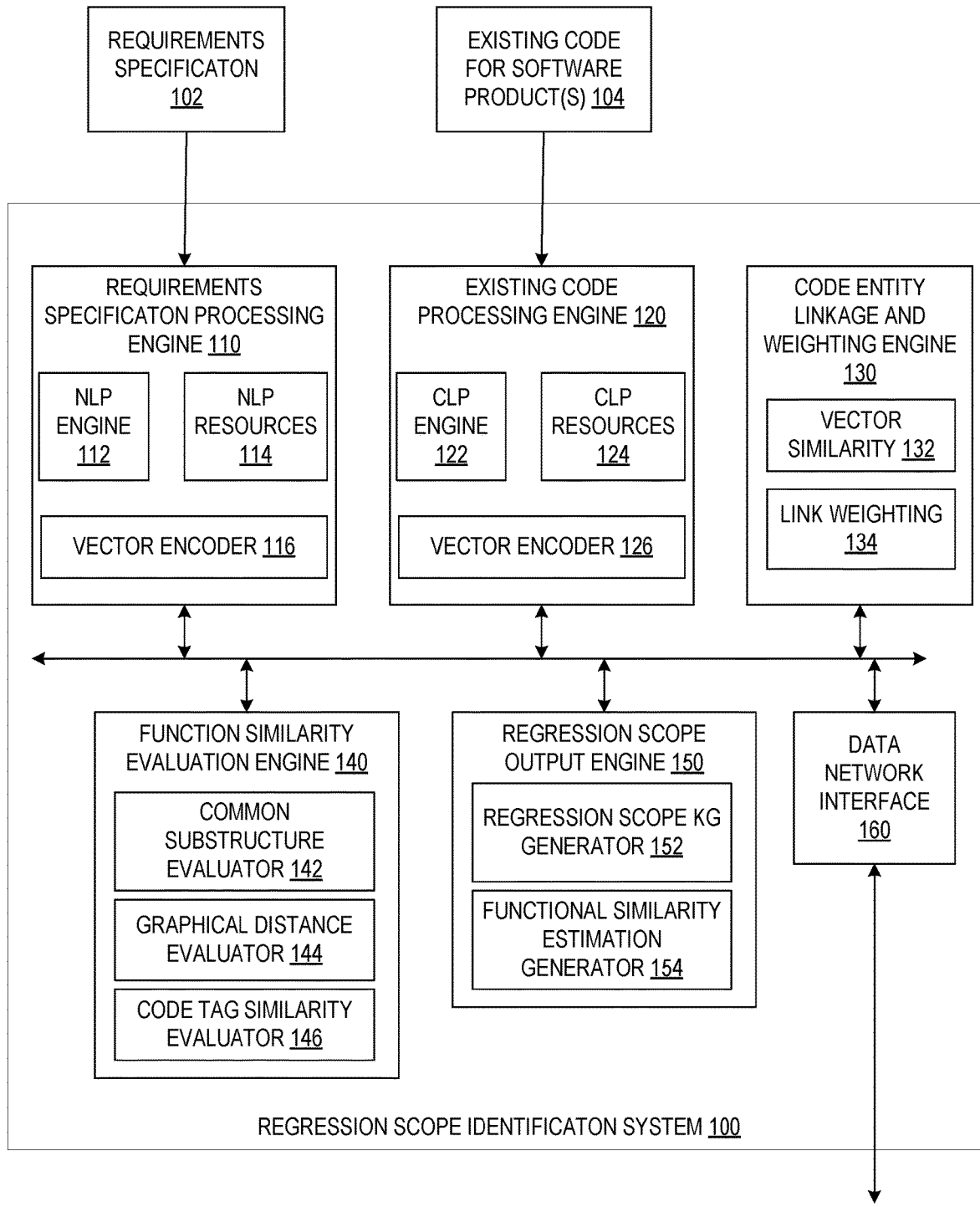
FIG. 1 is an example block diagram of the primary operational components of an automated regression scope identification system in accordance with one illustrative embodiment.

When a developer is presented with a new requirement for an existing software product specifying a functionality that is to be implemented in the software product, either through modification of an existing function or addition of a new function, the developer needs to determine the impact of the modification and generate a regression scope for the modification. The regression scope specifies which portions of the existing software product and/or other related software products are affected by a given modification to the existing software product either through changing the existing code to change the way in which it operates or by adding new code/functionality to the existing code that changes the way in which it operates (references to "code" herein are referring to computer executed code in any of a number of programming languages). Determining the regression scope helps developers to know what testcases to execute to test the modified software product after the changed or new functionality is implemented, to determine whether the modifications negatively affect other working portions of the software product and/or other software products. The execution of testcases to test these portions of the code is referred to as regression testing.

The regression scope is determined by development teams manually based on the developers' own subject matter expertise from their own experiences in running testcases as well as their own personal knowledge of the existing software product(s) involved. The developers may utilize some developer tools to execute testcases, but in general are required to manually determine which testcases to run and then evaluate the results of such testcases manually to determine whether a modification to the software product negatively impacts other portions of the software product or other software products. This takes a significant amount of time and manual effort for the human developer to accomplish, resulting in high costs for making changes to existing software products or implementing new features. Moreover, many times this manual process may generate inaccurate results due to human limitations and the sheer size and complexity of the software products being evaluated.

Moreover, often there is no clear correlation between function points described in the higher level requirements specifications, and the underlying code that is used to implement those functions. Function points are descriptions of functions from a code function level, e.g., "searchOrder( )" or "searchBill( )", where the function is described at a high level but one cannot see the relationships between the functions, e.g., in this example, both functions may use the same database fetch function to get a result, but this cannot be determined from the function points themselves. Developers can only trace what function points are involved in each function based on their own understanding, experiences, and expertise, to find the impact of a modification to the software product.

Because of these limitations of largely manual processes for determining regression scope, it would be greatly beneficial to have an automated computer tool that is able to evaluate new requirements and determine the regression scope of such new requirements automatically, and provide a representation of the regression scope to developers and testcase engineers so as to accurately identify the impact of changes to code to implement the new requirements. The illustrative embodiments provide an automated improved computer tool that operates to link function points to code entities in the code of a software product and thereby automatically generate the scope of affected function points through code changes. This allows the regression scope to be automatically identified for use in identifying what testcases should be executed to test the code changes.

In some illustrative embodiments, the improved computing tool and improved computing tool operations provide mechanisms that automatically parse and analyze a received requirements specification set forth in a requirements specification data structure, and generate a knowledge graph of these functions, where this knowledge graph comprises a hierarchical representation of function entities. A function entity is a data structure representation of a function specified in the requirements specification set forth in the requirements specification data structure. The function entity may store parameters, tags, and features associated with the function specified in the requirements specification, such as related terms/phrases extracted from the requirements specification which further define the function. The function entity is the entity of a specific function point construction. The source data for the function entity comes from the requirements specification and stories, where a user "story" is an informal, general explanation of a software feature written from the perspective of the end user which articulates how a software feature will provide value to the customer. The content of the function entity is composed of the parameters, tags, and features extracted from, or deduced from the features extracted from, the elements of the natural language content of the requirements specification and stories through computer natural language processing operations.

In addition to generating the knowledge graph of the requirements specification, the improved computing tool and improved computing tool operations provide mechanisms to automatically parse and analyze the existing code to extract key features, generate code entities based on the extracted key features, and determine the portions of existing code corresponding to the function entities identified in the knowledge graph of the requirements specification, to generate linkages between function entities and code entities. The illustrative embodiments further provide an improved computing tool and improved computing tool operations that automatically analyze the knowledge graph to identify the regression scope of the new requirements. The improved computing tool and improved computing tool operations, in accordance with some illustrative embodiments, provide an output that specifies the regression scope such that the developers are able to determine the impact of code changes to implement the new requirements and what portions of the existing code would need to be tested by the running of testcases to ensure proper functioning of the existing code and/or new code. This output may be provided in a graphical manner showing dependencies of function entities and code entities such that the regression scope may be easily identified in a visual manner.

It should be appreciated that the requirements specification data structure is a computer data structure that stores the natural language and/or structured content comprising text describing requirements for one or more new or modified functionality of an existing software product or software product(s). The requirements specification data structure may be composed of data transmitted to a computing device or stored in a storage device and loaded into a computer memory as an in-memory data structure upon which a computer processor may operate to perform the functions described herein. The content of the requirements specification data structure comprises data that defines the functional requirements for the one or more new or modified functionalities of the existing software product(s), where these functional requirements specify the functions and/or capabilities that the software product(s) are to be able to perform or have once the requirements specification is implemented by the development teams. For example, the requirements specification data structure may comprise content in natural language, able to be parsed and processed by computer natural language processing mechanisms, of the type "As a user, when I open the system, I need to be able to search the order in the homepage," which indicates that the software product has a requirement to provide a function that allows a user to search an order in a homepage when the system is opened. The requirements specification data structure comprises content that defines such functional requirements at a function level without implementation details, which is a higher level of abstraction than a code level implementation of these functional requirements which would specify the code implementation of the functions.

With the mechanisms of the illustrative embodiments, requirements specifications are provided which have natural language content specifying the requirements for modified or new functionality to be implemented in a software product, such as a software product comprising a plurality of micro-services. The natural language content is parsed and processed by a natural language processing engine that is specifically configured to analyze the natural language content to identify terms/phrases corresponding to function specifications, i.e., tokenize the natural language content based on a vocabulary of recognized terms/phrases. The natural language processing (NLP) engine performs sentence analysis, concept extraction, and entity linkage operations to generate, for each new function specified in the natural language content, a corresponding function entity. The sentence analysis identifies the primary recognizable portions of the language, e.g., particular terms/phrases recognized as being associated with the specification of functions, while the concept extraction extracts recognized concepts, e.g., the functions and sub-functions themselves, from those portions of the language. The entity linkage operation links the concepts, e.g., functions and sub-functions, together according to the dependencies determined from the portions of the language. These operations generate a function entity which comprises a hierarchical knowledge graph of the specified function and its related concepts, e.g., sub-functions.

For example, if the requirements specification included a statement "As a user, when I open the system, I need to be able to search the order in the homepage", the knowledge graph of the function entity would show the "homepage" function with a child function of "search order" indicating that the search order function is a part of the homepage function. Similarly, if the requirements specification also included a statement "As a user, when I open the system, I need to be able to create a new order in the homepage", the knowledge graph of the function entity would show the "homepage" function with the child function of "search order" as specified in the first requirements statement above, and then would also include a child function of "create order" indicating that the create order function is also part of the homepage function. Such function entities are built up based on the NLP processing of the natural language statements in the new requirements specification and demonstrate the relationships and dependencies of functions in the new requirements specification. Function entities may be generated for each function specified in the new requirements specification and may be evaluated by the mechanisms of the illustrative embodiments as described hereafter with regard to their impact and regression scope.

The function entities may be converted to a vector representation using a Word2Vec with a Continuous Bag of Words (CBOW) or other vector encoding mechanism. For example, the function entities may be specified through a Word2Vec operation as a one-hot encoding in which the vector representation comprises a "1" value in vector slots corresponding to recognized function/sub-function names of a function/sub-function vocabulary for which the function entity has corresponding function/sub-function names in the knowledge graph of that function entity, and a "0" value in vector slots for which the function entity does not have a corresponding function/sub-function name. Thus, the vector representation specifies the function and its sub-functions to thereby represent the knowledge graph in a vector form.

In addition to generating function entities for the functions specified in the requirements specification, the existing code is parsed and analyzed using specifically configured code language processing, similar to natural language processing, to extract features indicative of code structures that may be correlated with functions. For example, the code language processing may parse the code and extract code terms/phrases that are indicative of functions, i.e., tokenize the code based on an established vocabulary of code terms/phrases. Similar to natural language processing, the code terms/phrases that are used to tokenize the code may be specified by configuration data, such as dictionaries of recognizable terms/phrases, their synonyms, and the like, similar to natural language processing mechanisms. The code language processing may look at code comments, function names, git commit descriptions, and the like, as well as structural relationships in the code, issue tracking and project management tool identifiers, such as Jira® Issue IDs (Jira® is a registered trademark of Atlassian Pty. Ltd.), or the like, to extract code tokens, which are similar to natural language tokens but are specific to computer code. The git commit command is a core function of Git open source software, available from the Software Freedom Conservancy, which is used to track changes in a set of files in order to coordinate work among programmers collaboratively developing source code during software development.

The code tokens, extracted from the code using the code language processing, are then used to generate a code entities and a vector representation of the extracted tokens. With regard to the vector generation, as an example, a Word2Vec encoding, which may employ a trained continuous bag of words (CBOW) model, trained continuous skip-gram model, or the like, along with a one-hot encoding, may be used to generate a vector representation of the extracted code tokens. Of course, other encoding mechanisms that may be readily apparent to those of ordinary skill in the art may also be utilized to generate a vector representation of the computer code. It should be appreciated that this may be done for each portion of code, each micro-service's code of a software product, and the like. The code entities correspond to the functions found in the source code by scanning the source code and performing code language processing on the source code, e.g., the function "searchOrder(id)" may be identified through code language processing and a corresponding code entity is generated, e.g., $Entity_{searchOrder}$. The code entity is populated with various tags corresponding to the extracted code tokens identified in association with the identified function.

Having generated vector representations of the functions specified in the requirements specification and the various code entities in the existing code, the improved computing tool and improved computing tool operations of the illustrative embodiments perform a vector similarity analysis to thereby identify a linkage between function entities extracted from the requirements specification and code entities extracted from the existing code. That is, based on a vector similarity analysis, the closest code entities to the function entities are identified, i.e., code entities having a similarity, or vector distance, that is less than a given threshold are determined to be sufficiently linked. This threshold similarity or distance may be selected based on a desired implementation and may result in a plurality of code entities being associated with function entities. The identification of the linked function entities and code entities allows the mechanisms of the illustrative embodiments to automatically generate a knowledge graph that represents these linkages between function entities and code entities. There may be a different knowledge graph generated for each function entity of the requirements specification such that it may be determined what code entities are affected by the implementation of the specified function in the requirements specification.

Having generated a knowledge graph(s) for the function entity, or entities, that links code entities to the function entity or entities, the mechanisms of the illustrative embodiments further operate to weight these linkages in accordance with one or more weighting features of the code. In one illustrative embodiment, these weighting features include the call depth or distance in a hierarchical calling order of the function, a code size of the portion of code corresponding to the code entity, and a determined complexity of the portion of code corresponding to the code entity. The call depth can be determined based on an analysis of the calling relationships between portions of code corresponding to code entities linked to the function entity. The code size may be determined based on a measure of the number of lines of code included in the portion of the code corresponding to the code entity, or any other suitable measure of code size. This may be a raw numerical value of the number of lines of code, a percentage of the overall software product's code that this code represents, or the like.

The code complexity may be determined based on a function of various aspects of the portion of code including a number of variables, inclusion of if-then logic and the number of if-then logic statements, a number of other functions called by the portion of code, and the like. One or more of these weighting features may be used and/or combined to generate a weighting factor for a corresponding link between the function entity and the code entity. For example, for portions of code of a code entity that are determined to have a relatively smaller depth (and thus, more influential on other code entities linked to the function entity), a relatively larger code size, and a relatively higher complexity than other code corresponding to other code entities linked to the function entity, the weight factor for the corresponding link will be relatively higher than these other code entities. A weighting function may be provided that automatically evaluates these weighting features and generates the corresponding weighting factor based on an evaluation of these weighting features alone and/or in combination.

The weighting of the linkages between function entity and code entities provides insight into what code entities are key to the function entity. Based on this information, it can be determined that if a function entity is implemented, these are the code entities that will be affected, and which of these code entities should be prioritized based on their impact to the other code entities and the function implementation as a whole. That is, higher weighted links represent more important relationships between the function entity and code entity such that focus of the developer and the testcase engineers may be directed to these code entities in a priority order. Thus, through this linkage weighting, the mechanisms of the illustrative embodiments are able to identify the relative effects of the implementation of a requirements specification to code entities in the existing code of the software product to thereby identify a regression scope, i.e., what portions of the existing code need to be tested to ensure proper operation of the software product when implementing the new/modified functionality of the requirements specification.

In addition to identifying, for each function entity, the code entities that are linked to that function entity and their relative weightings or priorities, the mechanisms of the illustrative embodiments further provide an improved computing tool and improved computing tool operations for identifying functional similarities between function entities based on an evaluation of similarity factors. That is, function entity similarity weights are generated between function entities that indicate a degree of similarity of the function entities in the pairing. The similarity evaluation involves identifying a maximum common substructure of the knowledge graphs of the function entities, e.g., knowledge graphs $G_1$ to $G_n$ of function entities $Fun_1$ to $Fun_n$ contain the maximum common subgraph. The common substructure is then evaluated to determine the closer neighborhood nodes based on a graphical distance, e.g., $G_1$, $G_2$, and $G_3$ are the closer neighborhood nodes within the cluster of knowledge graphs $G_1$ to $G_n$. To identify closer neighborhood nodes and maximum common substructure, various tools, such as L2 norm for calculating distance, and Python libraries or other collections of core modules, may be used to identify these nodes and substructures. Any tools currently known or later developed that evaluate the distances between nodes in a knowledge graph and commonalities between hierarchical structures of knowledge graphs may be used without departing from the spirit and scope of the present invention.

Based on the closer neighborhood nodes, or knowledge graphs, e.g., $G_1$, $G_2$, and $G_3$ in the above example, the tags of the code entities in the maximum common substructure, linked to the function entities of the knowledge graphs, are evaluated to identify counts of the same or similar tags across the knowledge graphs. This similarity between tags may be determined based on exact similarity as well as similar meaning, as may be represented by natural language processing resources, such as synonym databases and dictionaries for example. The individual similarity values of the code entities may provide information to the developers and other personnel involved in implementing the requirements specification, what portions of existing code are similar to the new requirements based on the knowledge graph representations.

In this way, the developers are able to more quickly identify estimations of the effort to implement the new requirements of the requirements specification. For example, assume that there is an existing function "search order" which it took 5 person-days to implement. Now assume that a requirements specification is received that includes a new requirement of a new functionality, e.g., "search bill". The illustrative embodiments may analyze this new requirement, determine a similarity between the function entity for this new requirement and existing function entities corresponding to existing software products, and based on the knowledge graph determine that this new requirement is similar to the existing "search order" function entity. Thus, when the development team is performing their estimation for this new requirement, the regression scope output generated automatically by the mechanisms of the illustrative embodiments provides information that the development team can use to estimate the effort and cost for implementing the "search order" function as being similar to what was required for implementing the "search order" function.

The automatic identification of the portions of code that correspond to functions specified in requirements specifications via the knowledge graph based mechanisms of the illustrative embodiments provides an automated generation of an output of a knowledge graph representation that shows the code entity-function entity relationships and their relative priorities. Moreover, the operations of the illustrative embodiments provide an output specifying the function similarity between functions specified in the requirements specification and existing functions in the existing code of the software product. Thus, from this output, developers are informed of what portions of the existing code for the software product will be affected by changes to implement functions specified in the requirements specification, as well as existing portions of code, e.g., existing functions, that have structural resemblance to the anticipated new/modified functions specified in the requirements specification such that developers may generate accurate estimates of the amount of effort and cost involved in implementing the requirements of the requirements specification. Together, the output of the mechanisms of the illustrative embodiments provide an automated identification of the regression scope for developers of new/modified functionality in software products. Such automated regression scope identification allows for quick and low cost identification of testcases to execute to ensure proper operation of the existing code of the software products.

Such automated identification of the regression scope, while applicable to any software development project in which a requirements specification is used to specify new or modified functionality for a software product, is especially well suited for such development projects with regard to micro-services and micro-service architectures. In such a micro-services architecture, due to the modular design, it is often not readily apparent to software developers how a change in one micro-service will affect the operation of other micro-services with which it operates. With the mechanisms of the illustrative embodiments, the knowledge graph based analysis and automated identification of regression scope may be applied across micro-services so as to identify how a change to the functionality of one micro-service, as specified in a requirements specification associated with a first micro-service, affects the code of other micro-services in the micro-service architecture.

It should be appreciated that while the illustrative embodiments will be described with reference to software applications comprised of micro-services and the use of a micro-service architecture to generating software products, the illustrative embodiments are not limited to such. Rather the illustrative embodiments may operate in any development environment in which a requirements specification is received and the modified/new functionality defined in the requirements specification may be used to determine the regression scope of the implementation of the modified/new functionality with regard to new or existing computer code.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments provide an improved computing tool and improved computing tool operations for automatically identifying the regression scope associated with a requirements specification. The automated process involves generating one or more knowledge graphs, comprising relationships between function entities, to represent the functionality of the requirements specification and then generate a vector representation of the knowledge graph of the functions in the requirements specification. The automated process further involves generating vector representations of the key features of portions of code in the existing code of the software product, e.g., micro-service, and other software products, e.g., other micro-services in a micro-services architecture, with regard to the code entities. Moreover, the automated process determines linkages between code entities and function entities based on a vector similarity evaluation. The links are then weighted based on an evaluation of weighting factors, such as closest depth of call, code size, and/or code complexity, for example. In addition, the illustrative embodiments provide automated processes for evaluating similarities between the knowledge graph of the functions specified in the requirements specification and knowledge graphs of functions in existing software so as to provide an estimate of the effort and cost to implement the requirements of the requirements specification.

Figure 6:
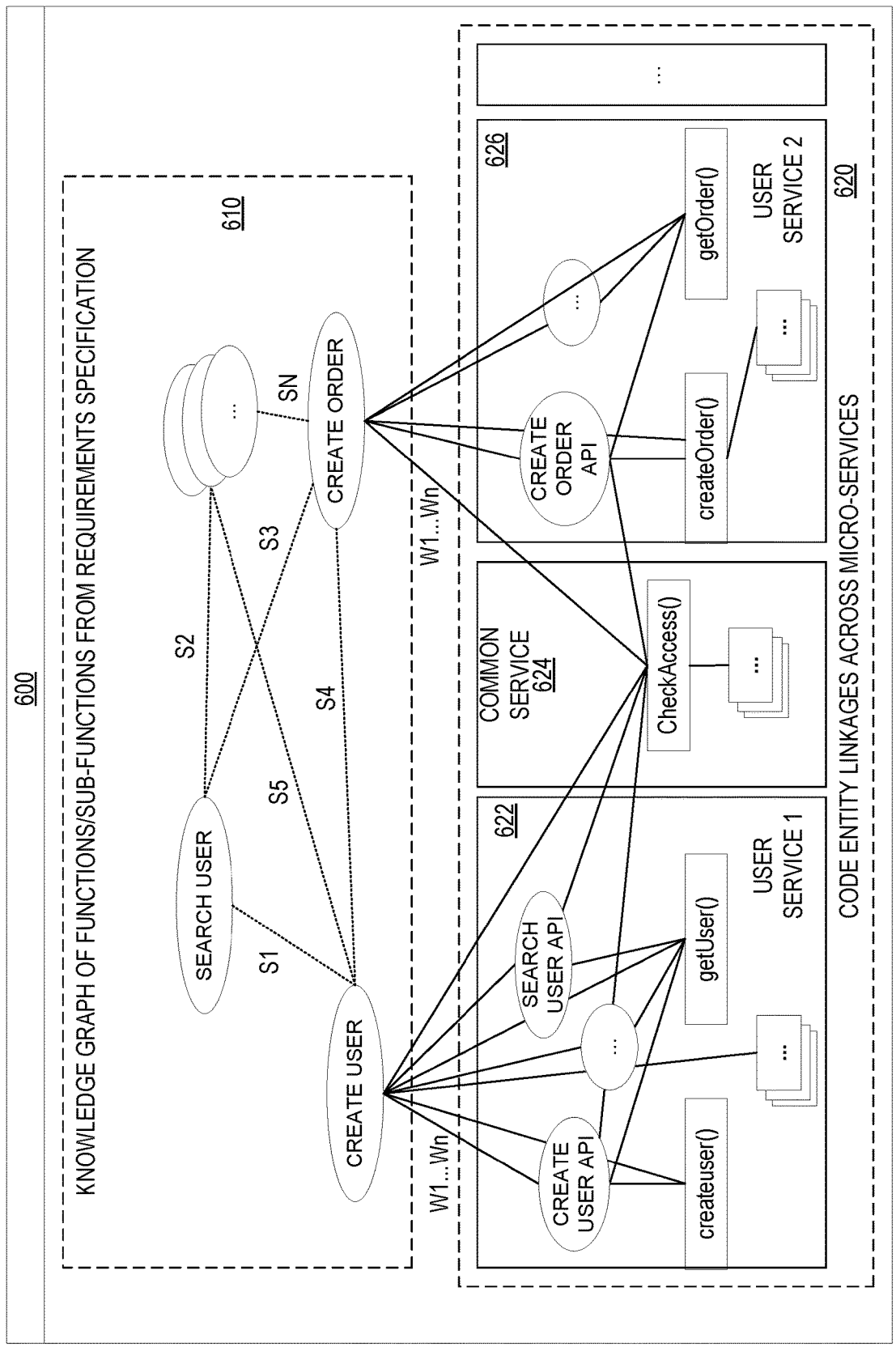
FIG. 6 is an example diagram illustrating an example regression scope output that is automatically generated based on the requirements specification and existing code in accordance with one illustrative embodiment.

The result is an automatically generated output, e.g., see FIG. 6 described hereafter, that specifies the regression scope as a weighted knowledge graph representation showing relationships between functions specified in the requirements specification and code entities extracted from the existing code, as well as identification of similar functions having similar knowledge graph structures to that of the function specified in the requirements specification. The weighted knowledge graph informs developers of the portions of code affected by the change specified in the requirements specification as well as the relative importance or priority of the effects on these portions of code. The similar function identification in the automated output provides an estimate of the amount of effort and cost in implementing the requirements of the requirements specification. It should be appreciated that the knowledge graph output is not only a graphical depiction, but is a data model that is searchable by users.

FIG. 1 is an example block diagram of the primary operational components of an automated regression scope identification system in accordance with one illustrative embodiment. As shown in FIG. 1, the automated regression scope identification system 100 includes a requirements specification processing engine 110, an existing code processing engine 120, a code entity linkage and weighting engine 130, a function similarity evaluation engine 140, a regression scope output engine 150, and a data network interface 160. These elements may be implemented as specialized computing hardware specifically configured to perform the corresponding operations attributed to these elements as described herein, software loaded into memory and executed by one or more processors to specifically configure the one or more processors to perform the operations attributed to these elements as described herein, or any combination of specialized hardware and/or executed software. It should be appreciated that while these are primary operational elements for explaining a functionality of the improved computing tool and improved computing tool operations of the illustrative embodiments, they do not represent the entirety of the hardware/software elements of an actual implementation of the automated regression scope identification system 100. For example, the automated regression scope identification system 100 may further include and/or operation in conjunction with, operating systems, libraries, communication interfaces, storage devices, storage software resources, and/or any other hardware/software resources provided by one or more computing devices.

The data network interface 160 provides a data communication The requirements specification processing engine 110 operates on a requirements specification 102, i.e., a document data structure that specifies requirements for functionality of a new or modified code of a software product or products, where the requirements specification 102 comprises natural language content, e.g., sentences, phrases, and the like, that specify the requirements for the modified or new functionality to be implemented in the software product(s), such as a software product comprising a plurality of micro-services.

The requirements specification processing engine 110 comprises a computer natural language processing (NLP) engine 112 and NLP resources 114, such as general and/or domain-specific dictionaries, synonym databases, and the like, which operate on the natural language content of the requirements specification 102 to parse and process the natural language content to extract features based on the NLP resources 114. The NLP engine 112 is specifically configured to analyze the natural language content to identify terms/phrases corresponding to function specifications, i.e., tokenize the natural language content based on a vocabulary of recognized terms/phrases. As mentioned previously, the NLP engine 112 performs sentence analysis, concept extraction, and entity linkage operations to generate, for each new function specified in the natural language content, a corresponding function entity.

For example, the requirements specification 102 may include various natural language content statements, such as "As a user, when I open the system, I need to be able to search the order in the homepage" or "As a user, when I open the system, I need to be able to create a new order in the homepage." The NLP engine 112 comprises logic that parses these natural language statements and extracts terms/phrases that are recognized based on the NLP resources 114.

Figure 2:
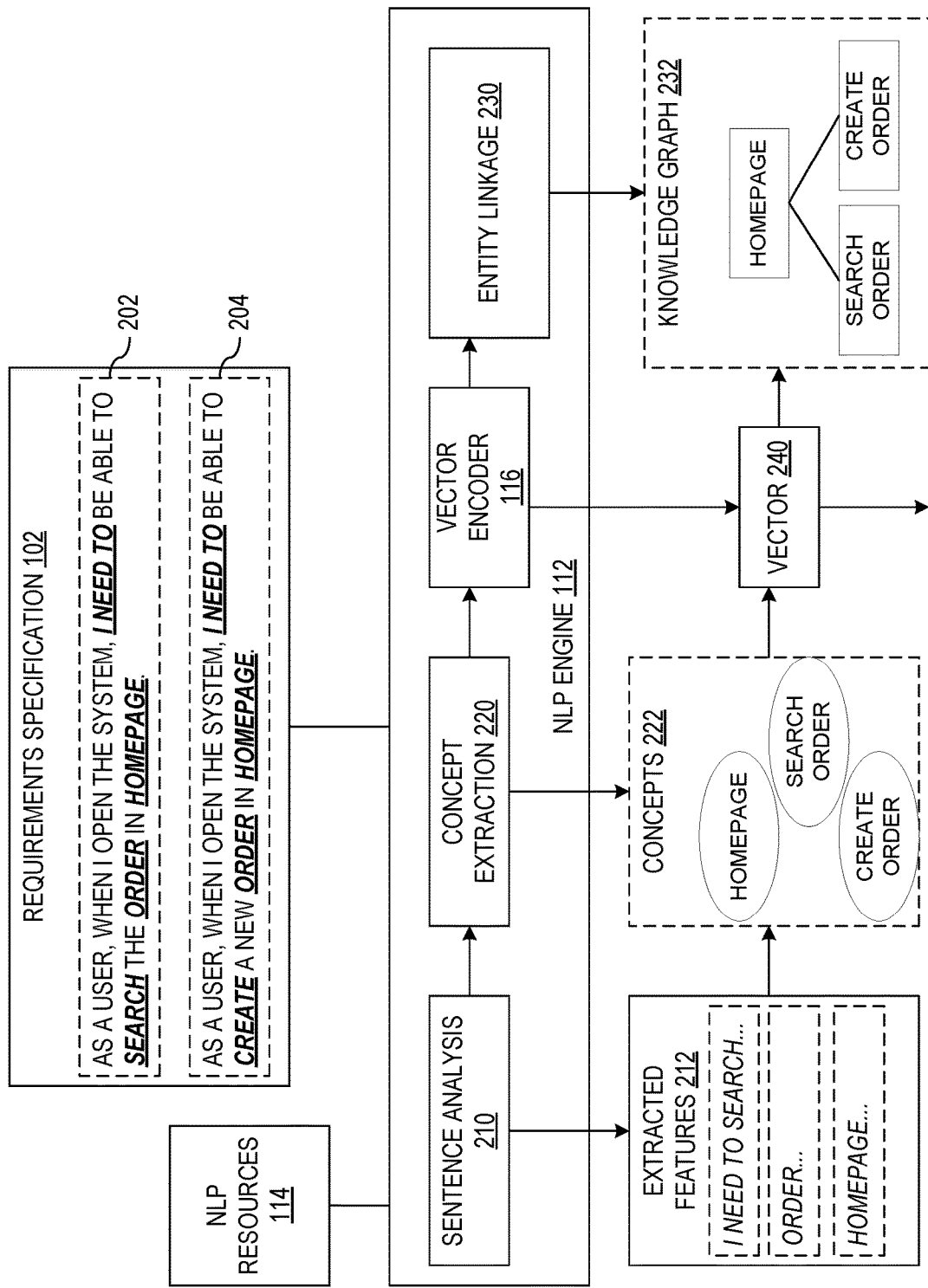
FIG. 2 is an example diagram illustrating a natural language processing of a requirements specification to generate a knowledge graph in accordance with one illustrative embodiment.

For example, FIG. 2 is an example diagram illustrating a natural language processing of a requirements specification to generate a knowledge graph in accordance with one illustrative embodiment. With continued reference to FIG. 1, and reference also to FIG. 2, as shown in FIG. 2, the requirements specification 102 includes the statements noted above 202 and 204. These statements are parsed and processed by the sentence analysis logic 210 of the NLP engine 112 based on the general/domain-specific NLP resources 114 to extract terms/phrases 212 indicative of functions and sub-functions that are to be implemented as part of new/modified functionalities in existing software products. For example, in the example shown in FIG. 2, from the above statements, the terms/phrase 212 of "homepage," "search", "create" and "order" are recognized in the statements (it should be appreciated that additional terms, such as "user", "open", and "system" may also be recognized based on the implementation, but for purposes of this illustration, the present description will focus on the homepage function and sub-functions). The NLP engine 112 recognizes, through concept extraction logic 220, based on the recognized terms, that the concepts 222 of a "homepage" as a function and the concepts "search order" and "create order" being sub-functions of the homepage function. Each of these are function entities indicating that the search order sub-function and create order sub-function are a part of the homepage function based on the language of the natural language content, i.e., the natural language content "in" homepage. Such function entities are built up based on the NLP processing of the natural language statements in the requirements specification 102 and are linked by entity linkage logic 230 to represent the relationships and dependencies of functions and sub-functions in the requirements specification 102. Function entities may be generated for each function and sub-function specified in the requirements specification 102 with the relationships represented as links between function entities in a hierarchical manner to thereby generate a knowledge graph model 232 of the requirements specification 102.

The requirements specification processing engine 110 may further include a vector encoder 116 that processes the concepts 222 and generates a vector representation of each of the concepts 222. For example, in some illustrative embodiments, the function entities may be converted to a vector representation 240 using a Word2Vec with a Continuous Bag of Words (CBOW) or other vector encoder 116. For example, the function entities may be specified through a Word2Vec operation of the vector encoder 116 as a one-hot encoding 240 in which the vector representation comprises a "1" value in vector slots corresponding to recognized function/sub-function names of a function/sub-function vocabulary for which the function entity has corresponding function/sub-function names in the knowledge graph of that function entity, and a "0" value in vector slots for which the function entity does not have a corresponding function/sub-function name. Thus, the vector representation 240 specifies the function and its sub-functions to thereby represent the concepts 222 corresponding to function entities of a knowledge graph 232 in a vector form.

With reference again to FIG. 1, in order to link the function entities specified in the requirements specification 102 to code entities already present in the existing code 104 of the software product(s), the existing code processing engine 120 receives the existing code 104 of the software product(s) and processes the existing code 104 to generate code entities by performing a code language processing (CLP), by CLP engine 122, similar to the NLP operations and NLP engine 112 described above, but using CLP resources 124 which are specifically directed to the software code domain and specific code features indicative of code structures. That is, the existing code processing engine 120 parses and analyzes the existing code 104 of one or more software product(s), e.g., micro-services in a micro-service architecture, to extract features indicative of code structures that may be correlated with functions, such as the functions of function entities generated from the requirements specification 102.

For example, the CLP engine 122 may parse the existing code 104 and extract code terms/phrases that are indicative of functions, i.e., tokenize the code based on an established vocabulary of code terms/phrases in the CLP resources 124. In some illustrative embodiments, the CLP resources 124 used by the CLP engine 122 specifies particular dictionaries, synonym databases, etc., indicative of coded functions present in code comments, function names, git commit descriptions, and the like. In addition, the CLP engine 122 may be configured with logic that looks to indications of structural relationships in the code, issue tracking and project management tool identifiers, such as Jira® Issue IDs (Jira® is a registered trademark of Atlassian Pty. Ltd.), or the like, to extract code tokens, which are similar to natural language tokens but are specific to computer code, and relationships between code tokens.

The code tokens, extracted from the existing code 104 using the CLP engine 122 and CLP resources 124, are then used to generate a vector representation 128 of the extracted tokens. As an example, vector encoder 126 of existing code processing engine 120 may be employed to encode the code tokens as a vector representation that may be compared to the vector representation of the function entities. The vector encoder 126 may operate using a Word2Vec encoding, which may employ a trained continuous bag of words (CBOW) model, trained continuous skip-gram model, or the like, along with a one-hot encoding, as mentioned previously, or any other suitable encoding that may be readily apparent to those of ordinary skill in the art in view of the present description. It should be appreciated that this may be done for each portion of code, each micro-service's code of a software product, and the like. Each of these portions of code have a corresponding code entity which comprises a representation of the portion of code as a data structure having tags corresponding to the extracted code tokens of that portion of code. Thus, a code entity represents the portion of code as a collection of extracted tags and this code entity has an associated vector representation generated by the encoder 126.

Figure 3:
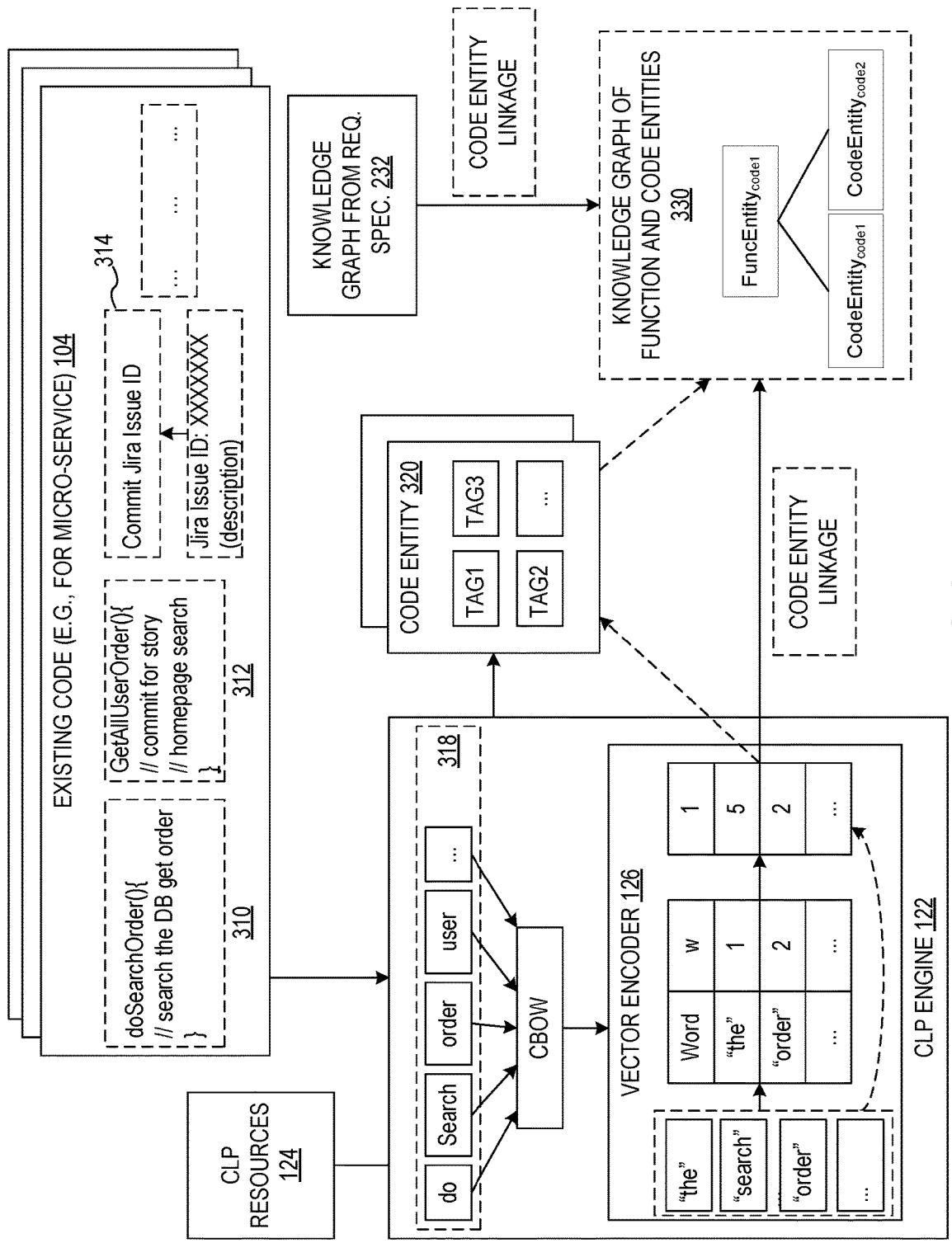
FIG. 3 is an example diagram illustrating a process for generating a code entity from a code language processing of existing code in accordance with one illustrative embodiment.

FIG. 3 is an example diagram illustrating this process of an existing code processing engine 120 for generating code entities based on code language processing (CLP) of existing code 104 in accordance with one illustrative embodiment. As shown in FIG. 3, the existing code 104 is input to the CLP engine 122 which operates on the existing code 104 using the CLP resources 124 to extract features 318 from portions 310-314 of the code, such as the code comments, function names, git commit description, function calling relationships, Jira ID, and the like. The CLP engine 122 extracts the features 318, e.g., recognized terms/phrases and the like, from the code language of the existing code 104 using CLP logic, which operates similar to NLP logic but using the CLP resources 124. It should be appreciated that the existing code 104 may be for a specific software product, micro-service, or the like. Thus, there may be multiple existing codes 104, such as one for each micro-service of a micro-services architecture, for example, or one for each software product in a suite of software products.

The CLP logic may implement one or more natural language processing algorithms and models, such as TensorFlow, HanLP, or other natural language processing algorithms that are specifically configured for parsing and processing computer code and extracting specific code features, such as terms/phrases from the comments, function names, git commit descriptions, Jira IDs, etc., as noted above. The CLP logic may employ other known natural language processing algorithms, such as CBOW, or the like, and encoding mechanisms, such as a Word2Vec, one-hot encoding, or the like, to represent the features extracted from the existing code 104 as a vector representation. An example in which extracted features are processed via natural language processing logic and the CBOW and one-hot encoding algorithms is depicted, but the illustrative embodiments are not limited to such and other code language processing (similar to natural language processing) and encoding algorithms may be used without departing from the spirit and scope of the present invention.

For example, using HanLP or another natural language processing algorithm that is specifically configured with CLP resources 124 to process terms/phrases of computer code, key terms/phrases are extracted from the existing code 104, e.g., keywords such as "do", "Search", "order", "user", Jira IDs such as "xxx-127", etc. The CLP engine 122, and vector encoder 126, may utilize a CBOW algorithm or the like to train the vector encoder 126 to predict a vector representation of the existing code 104 given the extracted features 318. The vector representation may be based on a one-hot encoding, such that the vector may be a 1*n vector, where n is the total number of features, e.g., key terms/phrases, in a given vocabulary of the CLP resources 124, and vector slots have a "1" if the corresponding key terms/phrases are in the extracted features and a "0" if they are not. This vector generation is similar to the vector generation performed on the requirements specification as described previously, which generates a vector representation of the functions specified in the requirements specification 102.

In addition to generating a vector representation for each portion of existing code 104, such as each micro-service in a micro-services architecture, the CLP engine 122, based on the extracted features 318, may generate a code entity 320 for each portion of the existing code 104. These code entities 320 store, for each code entity 320, the corresponding tags of that code entity. These tags may be the extracted features 318 for that code entity and are maintained as part of the code entity 320 for later tag similarity evaluations for functional similarity, as described hereafter. The code entity 320 is further linked or associated with the vector representation generated by the vector encoder 126 for that code entity 320. Thus, the code entity 320 links the extracted features 318, now represented as tags, with the vector representation of the code entity for further processing as described hereafter.

As shown in FIG. 3, the knowledge graph from the requirements specification 232, along with the vector representation(s) of the function entities, and the code entities 320 and their corresponding vector representations are used by a code entity linkage operation of the code entity linkage and weighting engine 130 to generate the knowledge graph of the function and code entities 330. That is, the knowledge graph 330 represents a hierarchy of the function entities specified in the knowledge graph 232 from the requirements specification 102 linked to the code entities 320 that have similarities in vector representations as determined through the code entity linkage, as described hereafter. Moreover, the linkages in the knowledge graph 330 may be weighted according to a weighting evaluation as described hereafter.

With reference again to FIG. 1, having generated vector representations of the functions specified in the requirements specification 102, as represented in the knowledge graph 232, and the various code entities 320 in the existing code 104, the improved computing tool and improved computing tool operations of the illustrative embodiments provide a code entity linkage and weighting engine 130 that comprises logic 132 that performs a vector similarity analysis to thereby identify a linkage between function entities extracted from the requirements specification and code entities extracted from the existing code. The vector similarity logic 132 of the code entity linkage and weighting engine 130 implements a vector similarity calculation algorithm that identifies a shortest distance between vectors such that the closest code entities to a function entity are linked together to build the knowledge graph 330. The closest code entities 320 may be identified based on a threshold vector distance such that any code entities that have a vector distance equal to or less than the threshold vector distance are considered sufficiently similar to the function entity to link the code entity 320 to that function entity.

This threshold similarity or distance may be selected based on a desired implementation and may result in a plurality of code entities 320 being associated with function entities. The identification of the linked function entities and code entities allows the mechanisms of the illustrative embodiments to automatically generate a knowledge graph 330 that represents these linkages between function entities and code entities 320. There may be a different knowledge graph 330 generated for each function entity of the requirements specification, e.g., each function entity in the knowledge graph 232, such that it may be determined what code entities 320 are affected by the implementation of the specified function in the requirements specification 102.

Having generated a knowledge graph(s) 330 for the function entity, or entities, that links code entities 320 to the function entity or entities, the mechanisms of the illustrative embodiments further provide link weighting logic 134 of the code entity linkage and weighting engine 130 that operates to weight these linkages in accordance with one or more weighting features of the code. In one illustrative embodiment, these weighting features include the call depth or distance in a hierarchical calling order of the function, a code size of the portion of code corresponding to the code entity, and a determined complexity of the portion of code corresponding to the code entity. The call depth can be determined based on an analysis of the calling relationships between portions of code corresponding to code entities linked to the function entity. The code size may be determined based on a measure of the number of lines of code included in the portion of the code corresponding to the code entity, or any other suitable measure of code size. This may be a raw numerical value of the number of lines of code, a percentage of the overall software product's code that this code represents, or the like.

The code complexity may be determined based on a function of various aspects of the portion of code including a number of variables, inclusion of if-then logic and the number of if-then logic statements, a number of other functions called by the portion of code, and the like. One or more of these weighting features may be used and/or combined to generate a weighting factor for a corresponding link between the function entity and the code entity 320. For example, for portions of code of a code entity 320 that are determined to have a relatively smaller depth (and thus, more influential on other code entities linked to the function entity), a relatively larger code size, and a relatively higher complexity than other code corresponding to other code entities linked to the function entity, the weight factor for the corresponding link will be relatively higher than these other code entities. A weighting function may be provided that automatically evaluates these weighting features and generates the corresponding weighting factor based on an evaluation of these weighting features alone and/or in combination.

Figure 4:
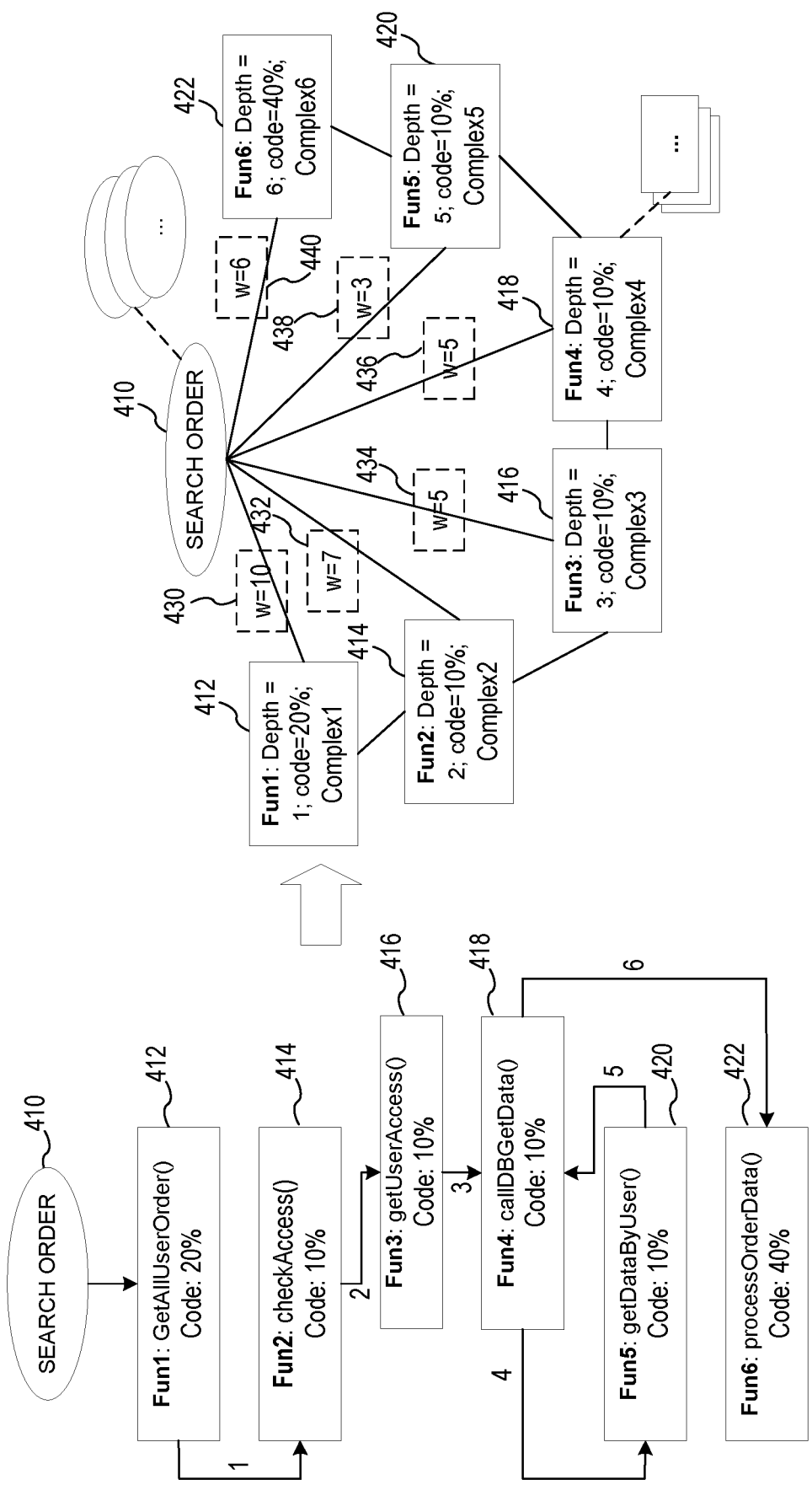
FIG. 4 is an example diagram illustrating a code weight evaluation operation in accordance with one illustrative embodiment.

FIG. 4 is an example diagram illustrating a code weight evaluation operation in accordance with one illustrative embodiment. As shown in FIG. 3, the generation of the knowledge graph 330 from the function entities and the code entities specifies the linkages between function entities and code entities, but there may not be a clear understanding from just the linkages as to which code entities are more influential on, or more affected by, changes to code to implement the function entity or modify the function entity. The code weight evaluation operation assigns weighting values to the various linkages in the knowledge graph 330 so as the relative importance or relative effects of code changes are represented by the weights. That is, the weighting of the linkages between function entity and code entities provides insight into what code entities are key to the function entity. Based on this information, it can be determined that if a function entity is implemented, these are the code entities that will be affected, and which of these code entities should be prioritized based on their impact to the other code entities and the function implementation as a whole with regard to testing and other software development operations. That is, higher weighted links represent more important relationships between the function entity and code entity such that focus of the developer and the testcase engineers may be directed to these code entities in a priority order.

As shown in FIG. 4, through the operation of the illustrative embodiments a function entity 410 has linked code entities 412-422 representing various functions performed by the portions of code, e.g., micro-services, that operate together to implement the function specified by the function entity 410. The code entities 412-422 have call relationships, e.g., Fun1 of code entity 412 calls Fun2 of code entity 414, Fun2 of code entity 414 calls Fun3 of code entity 416, Fun3 of code entity 416 calls Fun4 of code entity 418, Fun4 of code entity 418 calls Fun5 of code entity 420 and Fun6 of code entity 422. As a result, the various code entities 418 have a corresponding depth attribute in the call hierarchy as represented by the left side of FIG. 4. The numeric values of the arrows between code entities 412-422 represent the depth attribute for that call between code entities 412-422, e.g., Fun1=1, Fun2=2, Fun3=3, Fun4=4, Fun5=5, and Fun6=6 in this example.

In addition to a depth attribute, each code entity has a code size attribute that represents the relative amount of the total code size that is represented by the code entity, e.g., a percentage of the overall code that the code of the code entity represents. The overall code may be the total code size of all of the code entities 412-422 linked to the function entity 410. The code size may be measured in accordance with any suitable metric, such as number of lines of code, or the like. Thus, for example, Fun1 has a code size attribute of 20% indicating that the code entity 412 represents 20% of all of the code of code entities 412-422. Similarly, the other code entities 414-422 have their corresponding code size attributes of 10%, 10%, 10%, 10%, and 40%, respectively.

As an additional attribute, a code complexity attribute is provided for each code entity 412-422. This code complexity attribute may be determined based on a number of different complexity factors, such as number of variables present in the code of the code entity, the presence of, and number of, if-the or do-while, or other loops in the code and/or conditional statements in the code, the number of calls to other functions in the code, and/or other characteristics of code that may be indicative of complexity in the code. Various rules, equations, counters, and the like may be provided to calculate and combine the complexity factors of the code of the code entity. For example, as part of the code language processing, as certain terms/phrases indicative of specifications of variables are encountered, e.g., "var", "let", "const", etc. a counter may count instances of variable references in the code, either as a whole or for only unique variables in the code. Similarly, the parsing may identify "if" and "then" terms as well as "do" and "while" terms or other indicators of loops. Moreover, similar parsing and identification of calls may be identified. Each of these complexity factors may be counted using counter mechanisms and combined with the other complexity factors through one or more equations and/or rules to generate an overall representation of the complexity attribute of the code entity. The different complexity factors may be weighted differently based on a relative importance of the complexity factor to the overall complexity attribute, as determined for the particular desired implementation. The result is a complexity attribute that specifies the complexity of the code itself which may not be commensurate with the code size. That is, while the code of the code entity may not represent a large portion of the overall code, it can be more complex than other code entities and thus, it is important to not only take into consideration the code size, but also the code complexity when evaluating relative importance of the code entity to the regression scope of the requirements specification 102.

In one illustrative embodiment, the complexity factor may be code complexity attribute may be calculated as a percentage value that indicates its relative complexity to the code as a whole. For example, assuming that there are 3 complexity factors, e.g., if-then code loop presence, i.e., $F_{if-elseNumber}$(F1), number of variables, i.e., $F_{variablesNumber}$ (F2), and number of function calls to other functions, i.e., $F_{relatedFunctionCallingNumber}$(F3) for each code entity, a maximum of $F1_{codeN}$, $F2_{codeN}$, $F3_{codeN}$ can be identified and then code1's complexity is determined by:

$$\text{Complex}_{code1} = \frac{F1_{code1}}{F1_{codeN}} + \frac{F2_{code1}}{F2_{codeN}} + \frac{F3_{code1}}{F3_{codeN}}$$

in this example. This is just one example, and any functions, statistical representations, or the like, that measure the complexity of the code based on complexity factors specifying features of the code itself may be used without departing from the spirit and scope of the present invention.

Based on the various weighting factors, e.g., depth attribute, code size attribute, and complexity attribute, a qualitative and/or quantitative analysis of these weighting factors is performed to generate a weight value that is assigned to a corresponding link between a function entity and a code entity in the regression scope knowledge graph. These weight values indicate the relative importance of the link between function entity and code entity with regard to regression scope, testcase execution, etc. to ensure proper operation of the existing code should the function of the function entity be implemented in accordance with the requirements specification. Thus, through this linkage weighting, the mechanisms of the illustrative embodiments are able to identify the relative effects of the implementation of a requirements specification to code entities in the existing code of the software product to thereby identify a regression scope, i.e., what portions of the existing code need to be tested to ensure proper operation of the software product when implementing the new/modified functionality of the requirements specification.

As an example, the weight calculation may be based on an analytic hierarchy process (AHP) model. Assuming the same 3 complexity factors as discussed above, i.e., $F_{if-elseNumber}$(F1), $F_{variablesNumber}$(F2), $F_{relatedFunctionCallingNumber}$(F3), first the scale is determined and a judgement matrix is constructed. The appropriate scale is determined by a two-by-two comparison between the complexity factors. After establishing the hierarchy, it is necessary to compare the weight of each factor and its subordinate indexes, and a quantitative scale is used to realize the transformation from qualitative to quantitative. This process is combined with developer scoring to finally obtain the judgment matrix table. Using a 1-5 scale method, for example, as an example, assume that the F2 factor is more important than the F1 such that the F2 scores at 3, then the F2 relative to the F1 is to take its inverse ⅓ that is, 0.3333. An example judgement matrix, or table, is shown below:

TABLE 1

Example of Judgement Matrix

|  | F1 | F2 | F3 |
|---|---|---|---|
| F1 | 1 | 0.333 | 0.5 |
| F2 | 3 | 1 | 0.5 |
| F3 | 2 | 2 | 1 |

Thereafter, eigenvector, eigen root calculation and weight calculation are performed. If weights need to be calculated, the eigenvector values are calculated first, and a statistical analysis computing tool, such as the IBM® SPSS® software platform, available from International Business Machines Corporation of Armonk, New York, provides the eigenvector indicators. The maximum eigen root value (consistency index (CI)) is also obtained, which is used in the next step of consistency testing. The following table shows an example of AHP hierarchical analysis results obtained through this process.

TABLE 2

Example of AHP Hierarchical Analysis Results
AHP Hierarchical analysis results

| Item | Eigenvector | Weight % | Max Eigenvalue | CI |
|------|-------------|----------|----------------|-------|
| F1   | 1.219       | 31.372%  | 4.071          | 0.024 |
| F2   | 1.667       | 41.680%  |                |       |
| F3   | 1.078       | 26.948%  |                |       |

Thereafter, a consistency check is performed. When constructing the judgment matrix, there may be logical errors, such as A is more important than B and B is more important than C, but then C is more important than A. Therefore, it is important to use the consistency test to check whether there is a problem. The consistency test is analyzed using the AHP consistency ratio (CR) value, and a CR value less than 0.1 indicates that the consistency test is passed, while the opposite indicates that the consistency test is not passed. If the data do not pass the consistency test, one checks whether there are logical problems, etc., and re-enters the judgment matrix for analysis. For the calculation of CR, CR=CI/RI, where the CI value was obtained when the eigenvector is sought, and the random consistency index (RI) value is obtained directly from the judgement matrix. For example, in the above example, the CI value is 0.024, the RI value is 0.900, and the corresponding CR value is 0.026. The IBM® SPSS® platform will directly output this result and the consistency test result. The percentage value for each factor is then obtained and the code entity's weight, e.g., CodeEntity1's weight, can be obtained using any suitable function for the particular implementation, such as weight=F1*31.372%+F2*41.680%+F3*26.948% in this example.

Again, with reference to FIG. 1, in addition to identifying, for each function entity, the code entities that are linked to that function entity and their relative weightings or priorities, the mechanisms of the illustrative embodiments further provide an improved computing tool and improved computing tool operations for identifying functional similarities between function entities based on an evaluation of similarity factors. That is, the function similarity evaluation engine 140 comprises logic 142-146 that operate on the knowledge graphs of function entities and tags of the code entities associated with the function entities to generate function entity similarity weights between function entities generated from the requirements specification, and function entities already associated with the existing code through previous knowledge graph generation. The function entity similarity weights indicate a degree of similarity of the function entities, from a code implementation perspective, in each combination of a requirements specification function entity and one or more other existing function entities.

The similarity evaluation involves the common substructure evaluator 142 identifying a maximum common substructure of the knowledge graphs of the function entities, e.g., knowledge graphs $G_1$ to $G_n$ of function entities $Fun_1$ to $Fun_n$ contain the maximum common subgraph. For example, given two uni-directed graphs $G=(V_G, E_G)$, $F=(V_F, E_F)$, where V is vertices and E is edges, the common substructure evaluator 142 identifies a maximal subset $S \subseteq V_G$ of $V_G$ such that the derived subgraph G[S] of S is isomorphic to a subgraph of F. If F is a cluster of size k, then the common substructure evaluator 142 can determine whether there is a cluster of size k in G by means of a maximal common subgraph.

The common substructure is then evaluated by the graphical distance evaluator 144 to determine the closer neighborhood nodes based on a graphical distance, e.g., $G_1$, $G_2$, and $G_3$ are the closer neighborhood nodes within the cluster of knowledge graphs $G_1$ to $G_n$. Based on the closer neighborhood nodes, or knowledge graphs, e.g., $G_1$, $G_2$, and $G_3$ in the above example, the tags of the code entities, linked to the function entities of the knowledge graphs are evaluated by the code tags similarity evaluator 146 to identify counts of the same or similar tags across the knowledge graphs. This similarity between tags may be determined based on exact similarity as well as similar meaning, e.g., "admin" and "administrator" mean the same thing, as may be represented by natural language processing resources, such as synonym databases and dictionaries for example. The individual similarity values of the code entities may provide information to the developers and other personnel involved in implementing the requirements specification, what portions of existing code are similar to the new requirements based on the knowledge graph representations. In this way, the developers may be able to more quickly identify estimations of effort and cost needed to implement the requirements of the requirements specification.

As an example, the elements in a knowledge graph may be represented as a tuple data structure, such as a triplet of the type <sub, pre, obj>. A Python library, or other set of core modules, may be used to provide functionality for obtaining the maximum common substructure and a distance calculation may be used to generate the closest neighborhood within the maximum common substructure, e.g., using a L2 norm function to calculate the distances between nodes and identify the smallest distance(s), e.g., nodes that are within a threshold distance. The tags of these nodes may then be compared, e.g., the tags of the CodeEntities corresponding to the nodes, to get the similarity to the FunctionEntity. From the comparison, counts of the same or similar tags are generated Generate same tags counts, e.g., FunctionEntity1(G1) contains 5 CodeEntities, FunctionEntity2 (G2) contains 5 CodeEntities, and the 5 CodeEntities in FunctionEntity1(G1) have a total of 10 tags with 8 of these tags being the same as FunctionEntity2(G2) related CodeEntity tags. In determining the similarity between tags, synonyms and other data structures specifying similarity of meaning between similar tags may be used to identify the tags that are considered "the same" between code entities. The same or similar tag counts are then used to generate a score for the similarity between the function entities and if this score is equal to or above a predetermined threshold, then the function entities may be determined to be sufficiently similar for representation as similar function entities in the regression scope output generated by the mechanisms of the illustrative embodiments.

Figure 5:
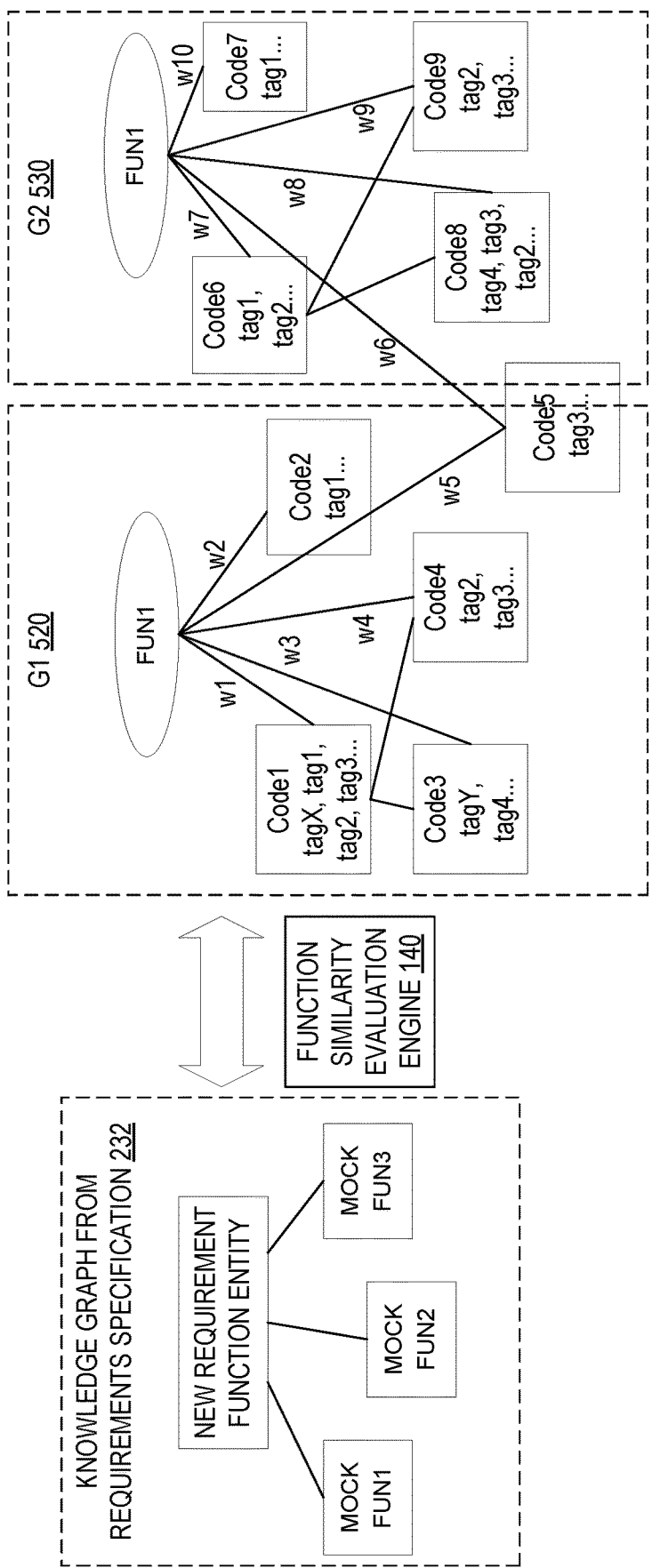
FIG. 5 is an example diagram illustrating a function similarity evaluation operation in accordance with one illustrative embodiment.

FIG. 5 is an example diagram illustrating a function similarity evaluation operation in accordance with one illustrative embodiment. As shown in FIG. 5, the knowledge graph 232 obtained from the requirements specification may be provided as an input to the function similarity evaluation engine 140 which operates on the function entities in the knowledge graph 232 and function entities associated with existing functions of the software product(s) to determine a similarity of a function entity in the knowledge graph 232 to one or more function entities in the existing software product(s), e.g., identifying which existing function entities in the existing software product(s) can assist in estimating the effort and costs needed to implement the function entities corresponding to the new or modified functions specified in the requirements specification. As mentioned previously, this evaluation of similarity involves the identification of a maximum common subgraph, closest neighborhood, and similarity of tags evaluation. For example, in the depicted example of FIG. 5, the two different function entities 520 and 530 have a common code entity (Code5) and the code entities of function entities 520 and 530 have similar tags 1-4 and the counts for these similar tags are similar as well, e.g., 2 instances of tag1, 3 instances of tag2, 3 instances of tag3 (including the common code entity of Code5), etc. Thus, evaluating the similarity factors one determines that function entities 520 and 530 are similar and this similarity may be represented in a portion of the regression scope output generated by the mechanisms of the illustrative embodiments.

As mentioned previously, the automatic identification of the portions of code that correspond to functions specified in requirements specifications via the knowledge graph based mechanisms of the illustrative embodiments provides an automated generation of an output of a regression scope knowledge graph representation that shows the code entity-function entity relationships and their relative priorities. Moreover, the operations of the illustrative embodiments provide an output specifying the function similarity between functions specified in the requirements specification and existing functions in the existing code of the software product.

As shown in FIG. 1, the regression scope output engine 150 comprises a regression scope knowledge graph generator 152 that generates the regression scope knowledge graph output for output to a client computing device, such as via a software development and/or testcase suite executing on the client computing device or the like. The regression scope knowledge graph generator 152 obtains the needed data for generation of the output from the code entity linkage and weighting engine 130 and, if needed for the particular implementation, the other elements 110-120 and 140. The regression scope output engine 150 further includes a functional similarity estimation generator 154 that generates the output indicating the similar functions for estimation purposes based on the operation of the function similarity evaluation engine 140.

FIG. 6 is an example diagram illustrating an example regression scope output that is automatically generated based on the requirements specification and existing code in accordance with one illustrative embodiment. As shown in FIG. 6, the regression scope knowledge graph and function similarity output generated by the regression scope output engine 150 may include a first portion 610 in which the knowledge graph of functions and/or sub-functions identified from the requirements specification 102 may be represented with similarity values S1-Sn shown between the various functions and/or sub-functions, as well as other existing functions in the existing software products. The linkages between the functions/sub-functions extracted from the requirements specification 102 may always be represented in the first portion 610 while linkages with other existing functions/sub-functions may be limited to only those having a similarity value above a predetermined threshold level of similarity, e.g., S2, S5, and Sn are all above a given threshold.

Moreover, the output may comprise a second portion 620 that represents the code entities, such as may be associated with micro-services like "User Service 1" 622, "Common Service" 624, and "User Service 2" 626, for the leaf nodes of the first portion 610, e.g., the sub-functions "Create User" and "Create Order" in this example. The second portion 620 may further include the relative weightings of the various links between code entities and the function entities, e.g., $w_1$ to $w_n$. Thus, the leaf level function entities have their associated regression scope knowledge graphs, as generated in the manner previously described, represented in the output and each function entity has its similarity to other function entities also represented in the output.

Thus, from this output, developers are informed of what portions of the existing code for the software product will be affected by changes to implement functions specified in the requirements specification, as well as existing portions of code, e.g., existing functions, that have structural resemblance to the anticipated new/modified functions specified in the requirements specification such that developers may generate accurate estimates of the effort and costs involved in implementing the requirements of the requirements specification. Together, the output of the mechanisms of the illustrative embodiments provide an automated identification of the regression scope for developers of new/modified functionality in software products. That is, from the output such as shown in FIG. 6, a test team is able to obtain a more accurate regression testcase list by identifying which existing code entities will need to be tested. Moreover, the output shows the code impact of the implementation of the requirements specification such that it can reduce the software development teams efforts to analyze the release scope and can clarify the deployment scope and control "go-live" risk.

For example, before an updated or modified software product release, the development team needs to do regression testing for the updated/modified code. With the mechanisms of the illustrative embodiments, an automated processing and analysis of the requirements specification and the existing code of the existing software product, and related software products, is performed to generate a regression scope analysis and output that assists the development team in knowing the effort and cost in implementing the functionality specified in the requirements specification, as well as what existing code will need to be tested as part of the regression testing to ensure proper operation of the new and existing code of the software product(s) involved. That is, by using the knowledge graph based mechanism of the illustrative embodiments, the code increment associated with the requirements specification can be analyzed to automatically obtain a representation of the impact of the new or modified functionality, and based on the weightings generated by the mechanisms of the illustrative embodiments, the development team is informed of the priority for the impacted functions and code. Thus, the development and/or testing team can, based on this automatically generated knowledge graph output representation of the impacted functions and code, find all the related testcases to make sure that no affected part of the code is missed when performing regression testing. Thus, such automated regression scope identification allows for quick and low cost identification of testcases to execute to ensure proper operation of the existing code of the software products, which results is lower risks that the released software product will have coding errors or unintended effects that may negatively impact the operation of the software product and/or its related software products, e.g., micro-services in a micro-services architecture.

Figure 7:
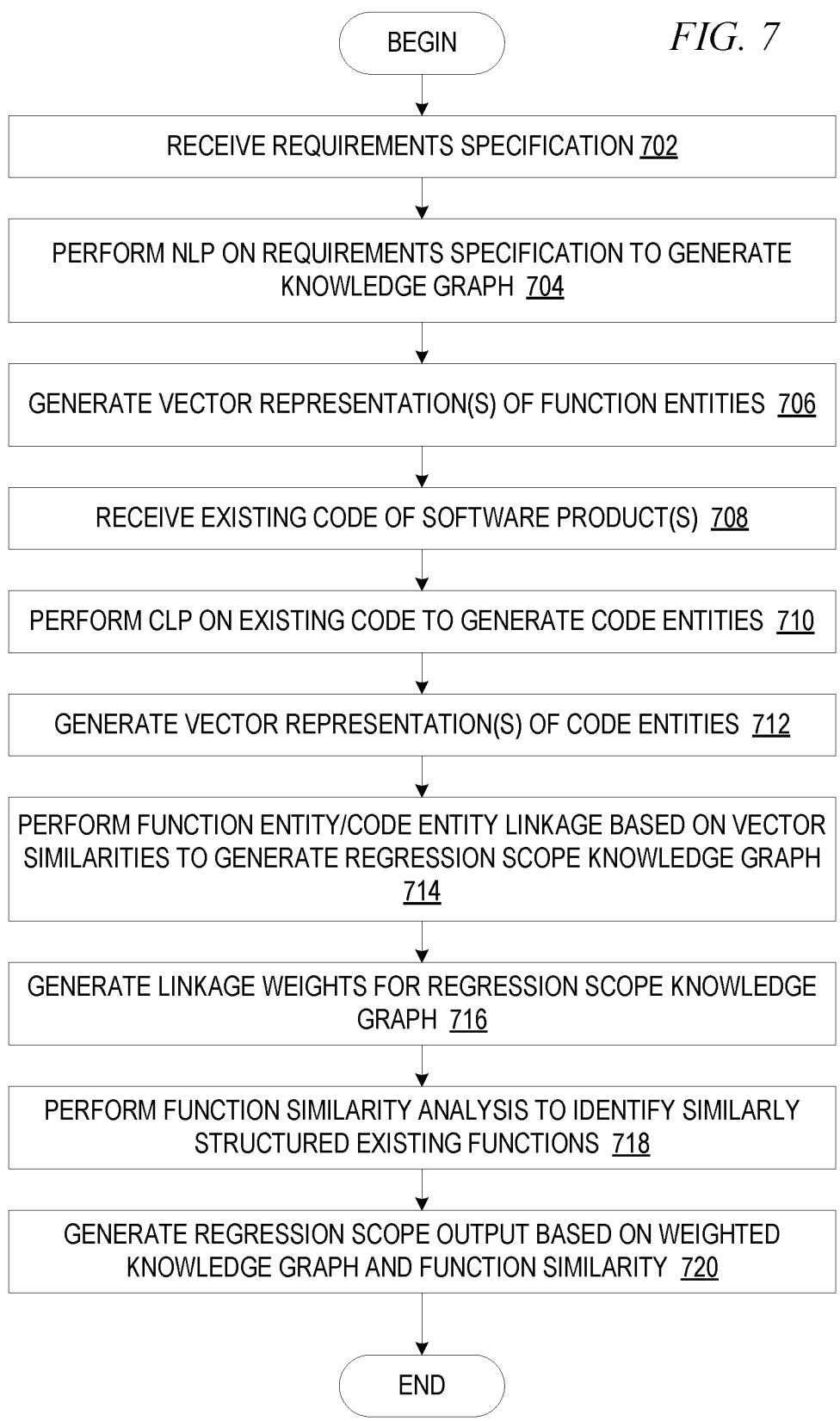
FIG. 7 is a flowchart outlining an example operation of an automated regression scope identification system in accordance with one illustrative embodiment.

FIG. 7 is a flowchart outlining an example operation of an automated regression scope identification system in accordance with one illustrative embodiment. It should be appreciated that the operations outlined in FIG. 7 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 7 and may make use of the results generated as a consequence of the operations set forth in FIG. 7, the operations in FIG. 7 themselves are specifically performed by the improved computing tool in an automated manner.

As shown in FIG. 7, the automated regression scope identification operation starts with receiving a requirements specification (step 702). The requirements specification is processed, such as by way of a computer natural language processing operation, to generate a knowledge graph representing the functions specified in the requirements specification (step 704). A vector representation of the function entities in the knowledge graph is generated (step 706). In addition, the existing code of the software product(s), e.g., micro-services of a micro-services architecture, is received (step 708) and processed using a code language processing (CLP) to generate code entities (step 710). Vector representations of these code entities are generated (step 712) and a function entity/code entity linkage is performed based on vector similarities to generate d on vector similarities to generate a regression scope knowledge graph (step 714). The linkages in the regression scope knowledge graph are then weighted (step 716) and a similarity analysis is performed between function entities to generate similarity values (step 718). A regression scope output is then generated based on the weighted regression scope knowledge graph and the function similarity values (step 720). The operation then terminates.

It can be appreciated from the above, that the illustrative embodiments are specifically directed to an improved computing tool and improved computing tool operations. All of the functions of the illustrative embodiments as described herein are intended to be performed using automated processes without human intervention. The illustrative embodiments of the present invention are not directed to actions performed by human beings, but rather logic and functions performed specifically by the improved computing tool. Moreover, even though the present invention may provide an output that ultimately assists human beings in performing software development and implementation and testing for implementing functionality specified in a requirements specification document, the illustrative embodiments of the present invention are not directed to actions performed by the human being viewing the results of the improved computing tool, but rather to the specific operations performed by the specific improved computing tool of the present invention itself. Thus, the illustrative embodiments are not organizing any human activity, but are in fact directed to the automated logic and functionality of an improved computing tool.

Figure 8:
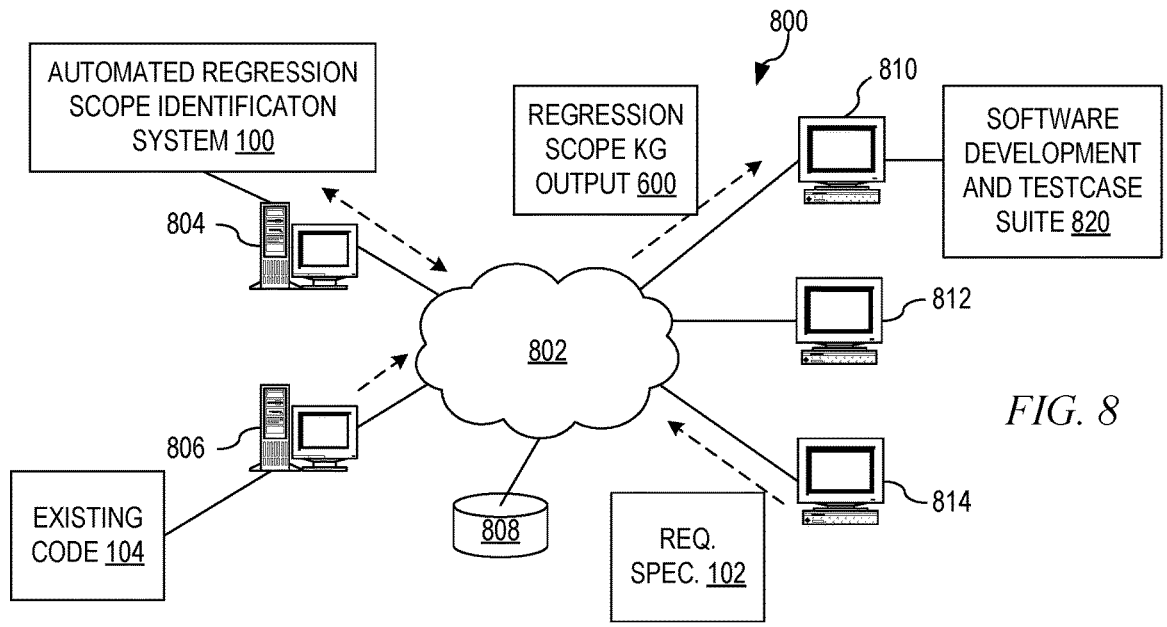
FIG. 8 is an example diagram of a distributed data processing system in which aspects of the illustrative embodiments may be implemented.
Figure 9:
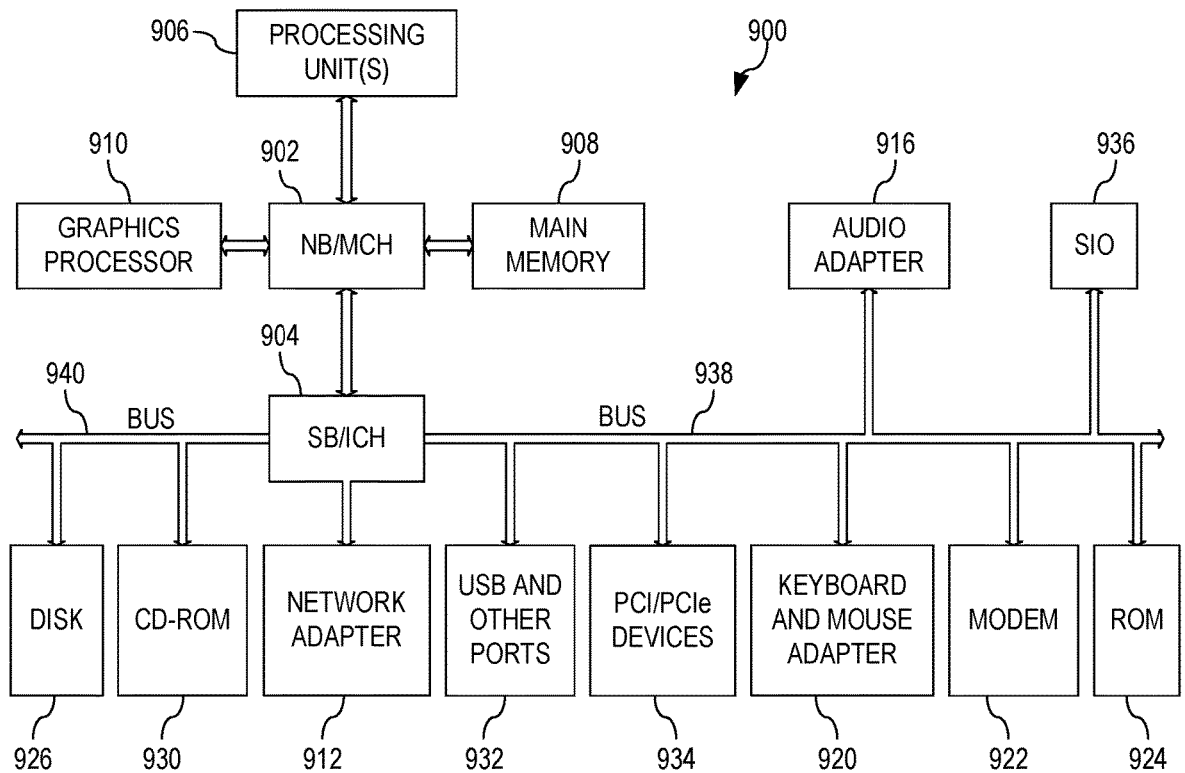
FIG. 9 is an example block diagram of a computing device in which aspects of the illustrative embodiments may be implemented.

From the above, it can be appreciated that the illustrative embodiments may be utilized in many different types of data processing environments. In order to provide a context for the description of the specific elements and functionality of the illustrative embodiments, FIGS. 8 and 9 are provided hereafter as example environments in which aspects of the illustrative embodiments may be implemented. It should be appreciated that FIGS. 8 and 9 are only examples and are not intended to assert or imply any limitation with regard to the environments in which aspects or embodiments of the present invention may be implemented. Many modifications to the depicted environments may be made without departing from the spirit and scope of the present invention.

FIG. 8 depicts a pictorial representation of an example distributed data processing system in which aspects of the illustrative embodiments may be implemented. Distributed data processing system 800 may include a network of computers in which aspects of the illustrative embodiments may be implemented. The distributed data processing system 800 contains at least one network 802, which is the medium used to provide communication links between various devices and computers connected together within distributed data processing system 800. The network 802 may include connections, such as wire, wireless communication links, or fiber optic cables.

In the depicted example, server 804 and server 806 are connected to network 802 along with storage unit 808. In addition, clients 810, 812, and 814 are also connected to network 802. These clients 810, 812, and 814 may be, for example, personal computers, network computers, or the like. In the depicted example, server 804 provides data, such as boot files, operating system images, and applications to the clients 810, 812, and 814. Clients 810, 812, and 814 are clients to server 804 in the depicted example. Distributed data processing system 800 may include additional servers, clients, and other devices not shown.

In the depicted example, distributed data processing system 800 is the Internet with network 802 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 800 may also be implemented to include a number of different types of networks, such as for example, an intranet, a local area network (LAN), a wide area network (WAN), or the like. As stated above, FIG. 8 is intended as an example, not as an architectural limitation for different embodiments of the present invention, and therefore, the particular elements shown in FIG. 8 should not be considered limiting with regard to the environments in which the illustrative embodiments of the present invention may be implemented.

As shown in FIG. 8, one or more of the computing devices, e.g., server 804, may be specifically configured to implement an automated regression scope identification system 100. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 804, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatically identifying a regression scope associated with a requirements specification and existing software product(s) and generating a graphical output of this regression scope for software development and testcase execution.

As shown in FIG. 8, as an example, a server 804 may be specifically configured through specialized hardware, software loaded into memory and executed by one or more processors, or any combination of specialized hardware and/or special configuration by software execution, to provide the automated regression scope identification system 100. The automated regression scope identification system 100 may receive, from a client computing device, e.g., client 814, a requirements specification 102 via the data network 802. The automated regression scope identification system 100 may also access the existing code 104 of the existing software product(s), such as micro-services of a micro-services architecture for defining software applications or software suites, such as may be provided by one or more server computing systems 806.

The automated regression scope identification system 100 may operate on the received requirements specification 102 and existing code 104 in the manner previously described above to generate a regression scope knowledge graph and function entity similarity evaluation. The automated regression scope identification system 100 may then generate a regression scope knowledge graph output 830 that may be provided to a software development team or other authorized users via one or more client computing devices 810. For example, the client computing device(s) 810 may provide software development computing tools and/or testcase execution tools 820 through which the regression scope knowledge graph output 830 may be output to assist the development and testing personnel in their understanding of the regression scope for implementing the functionality of the requirements specification 102.

As noted above, the mechanisms of the illustrative embodiments utilize specifically configured computing devices, or data processing systems, to perform the operations for automatically identifying a regression scope associated with a requirements specification and existing software product(s) and generating a graphical output of this regression scope for software development and testcase execution. These computing devices, or data processing systems, may comprise various hardware elements which are specifically configured, either through hardware configuration, software configuration, or a combination of hardware and software configuration, to implement one or more of the systems/subsystems described herein. FIG. 9 is a block diagram of just one example data processing system in which aspects of the illustrative embodiments may be implemented. Data processing system 900 is an example of a computer, such as server 804 in FIG. 8, in which computer usable code or instructions implementing the processes and aspects of the illustrative embodiments of the present invention may be located and/or executed so as to achieve the operation, output, and external effects of the illustrative embodiments as described herein.

In the depicted example, data processing system 900 employs a hub architecture including north bridge and memory controller hub (NB/MCH) 902 and south bridge and input/output (I/O) controller hub (SB/ICH) 904. Processing unit 906, main memory 908, and graphics processor 910 are connected to NB/MCH 902. Graphics processor 910 may be connected to NB/MCH 902 through an accelerated graphics port (AGP).

In the depicted example, local area network (LAN) adapter 912 connects to SB/ICH 904. Audio adapter 916, keyboard and mouse adapter 920, modem 922, read only memory (ROM) 924, hard disk drive (HDD) 926, CD-ROM drive 930, universal serial bus (USB) ports and other communication ports 932, and PCI/PCIe devices 934 connect to SB/ICH 904 through bus 938 and bus 940. PCI/PCIe devices may include, for example, Ethernet adapters, add-in cards, and PC cards for notebook computers. PCI uses a card bus controller, while PCIe does not. ROM 924 may be, for example, a flash basic input/output system (BIOS).

HDD 926 and CD-ROM drive 930 connect to SB/ICH 904 through bus 940. HDD 926 and CD-ROM drive 930 may use, for example, an integrated drive electronics (IDE) or serial advanced technology attachment (SATA) interface. Super I/O (SIO) device 936 may be connected to SB/ICH 904.

An operating system runs on processing unit 906. The operating system coordinates and provides control of various components within the data processing system 900 in FIG. 9. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 900.

As a server, data processing system 900 may be, for example, an IBM eServer™ System P® computer system, Power™ processor based computer system, or the like, running the Advanced Interactive Executive (AIX®) operating system or the LINUX® operating system. Data processing system 900 may be a symmetric multiprocessor (SMP) system including a plurality of processors in processing unit 906. Alternatively, a single processor system may be employed.

Instructions for the operating system, the object-oriented programming system, and applications or programs are located on storage devices, such as HDD 926, and may be loaded into main memory 908 for execution by processing unit 906. The processes for illustrative embodiments of the present invention may be performed by processing unit 906 using computer usable program code, which may be located in a memory such as, for example, main memory 908, ROM 924, or in one or more peripheral devices 926 and 930, for example.

A bus system, such as bus 938 or bus 940 as shown in FIG. 9, may be comprised of one or more buses. Of course, the bus system may be implemented using any type of communication fabric or architecture that provides for a transfer of data between different components or devices attached to the fabric or architecture. A communication unit, such as modem 922 or network adapter 912 of FIG. 9, may include one or more devices used to transmit and receive data. A memory may be, for example, main memory 908, ROM 924, or a cache such as found in NB/MCH 902 in FIG. 9.

As mentioned above, in some illustrative embodiments the mechanisms of the illustrative embodiments may be implemented as application specific hardware, firmware, or the like, application software stored in a storage device, such as HDD 926 and loaded into memory, such as main memory 908, for executed by one or more hardware processors, such as processing unit 906, or the like. As such, the computing device shown in FIG. 9 becomes specifically configured to implement the mechanisms of the illustrative embodiments and specifically configured to perform the operations and generate the outputs described herein with regard to the automated regression scope identification system 100.

Those of ordinary skill in the art will appreciate that the hardware in FIGS. 8 and 9 may vary depending on the implementation. Other internal hardware or peripheral devices, such as flash memory, equivalent non-volatile memory, or optical disk drives and the like, may be used in addition to or in place of the hardware depicted in FIGS. 8 and 9. Also, the processes of the illustrative embodiments may be applied to a multiprocessor data processing system, other than the SMP system mentioned previously, without departing from the spirit and scope of the present invention.

Moreover, the data processing system 900 may take the form of any of a number of different data processing systems including client computing devices, server computing devices, a tablet computer, laptop computer, telephone or other communication device, a personal digital assistant (PDA), or the like. In some illustrative examples, data processing system 900 may be a portable computing device that is configured with flash memory to provide non-volatile memory for storing operating system files and/or user-generated data, for example. Essentially, data processing system 900 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    generating a first knowledge graph of a received requirements specification data structure specifying functional requirements for a software product;
    generating, for function entities specified in the first knowledge graph, a first vector representation at least by executing a first computer encoding of textual content of the function entities into the first vector representation;
    generating one or more code entities for existing code for the software product, wherein the code entities comprise features associated with portions of the existing code;
    generating, for the one or more code entities, a second vector representation at least by executing a second computer encoding of textual content of the code entities into the second vector representation;
    linking selected code entities in the one or more code entities to selected function entities based on a vector similarity analysis between the first vector representation and the second vector representation; and
    generating a regression scope knowledge graph output based on the linked code entities and the function entities, wherein the regression scope knowledge graph output depicts relationships between the function entities corresponding to the functional requirements with code entities corresponding to portions of existing code for the software product.

2. The method of claim 1, wherein generating the first knowledge graph comprises:
    executing a computer natural language processing of the received requirements specification data structure to extract portions of natural language content corresponding to concepts that define the functional requirements; and executing entity linkage operations to link extracted concepts to one another in a hierarchical knowledge graph specifying a functional relationship between the extracted concepts, to generate the first knowledge graph.

3. The method of claim 1, wherein generating the one or more code entities comprises:

executing a computer code language processing of the received requirements specification data structure to extract code tokens from the existing code for the software product that correspond to functions of the existing code; and generating the one or more code entities based on the extracted code tokens, wherein the code entities comprise tags corresponding to the extracted code tokens.

4. The method of claim 3, wherein the code tokens are extracted from at least one of code comments, function names, git commit descriptions, or issue tracking and project management tool identifiers.

5. The method of claim 1, wherein linking selected code entities in the one or more code entities to selected function entities further comprises, for each selected function entity, of hte selected function entities, and for each code entity linked to each selected function entity:

weighting a link between each selected function entity and the code entity based on at least one of a call depth in a hierarchical calling order of each selected function entity, a code size of a portion of code corresponding to the code entity, or a determined complexity of the portion of code corresponding to the code entity.

6. The method of claim 5, wherein the weighting is based at least on the determined complexity of the portion of code corresponding to the code entity, and wherein the complexity is determined based on at least one of a number of variables in the portion of code, inclusion of code loop logic in the portion of code, or a number of other functions called by the portion of code.

7. The method of claim 1, further comprising executing, for a first function entity in the function entities specified in the first knowledge graph, a function similarity analysis with second function entities corresponding to the software product, wherein the function similarity analysis identifies a second function entity that has one or more linked second code entities having similar tags to first code entities linked to the first function entity at least in a common substructure between the first function entity and the second function entity.

8. The method of claim 7, further comprising weighting a relationship similarity link between the first function entity and the second function entity based on a degree of similarity between the similar tags of the first code entities and the linked second code entities.

9. The method of claim 8, wherein the regression scope knowledge graph output comprises a first portion that graphically represents the relationship similarity link between the function entities, and a second portion that graphically represents links between the function entities and their corresponding code entities.

10. The method of claim 1, wherein the received requirements specification data structure specifies functional requirements for one or more micro-services for the software product, and wherein the regression scope knowledge graph output comprises function entities and code entities of a plurality of micro-services of a micro-service architecture of the software product.

11. A computer program product comprising a computer readable storage medium having a computer readable program stored therein, wherein the computer readable program, when executed on a computing device, causes the computing device to:

generate a first knowledge graph of a received requirements specification data structure specifying functional requirements for a software product;

generate, for function entities specified in the first knowledge graph, a first vector representation at least by executing a first computer encoding of textual content of the function entities into the first vector representation;

generate one or more code entities for existing code for the software product, wherein the code entities comprise features associated with portions of the existing code;

generate, for the one or more code entities, a second vector representation at least by executing a second computer encoding of textual content of the code entities into the second vector representation;

link selected code entities in the one or more code entities to selected function entities based on a vector similarity analysis between the first vector representation and the second vector representation; and generate a regression scope knowledge graph output based on the linked code entities and the function entities, wherein the regression scope knowledge graph output depicts relationships between the function entities corresponding to the functional requirements with code entities corresponding to portions of existing code for the software product.

12. The computer program product of claim 11, wherein generating the first knowledge graph comprises:

executing a computer natural language processing of the received requirements specification data structure to extract portions of natural language content corresponding to concepts that define the functional requirements; and executing entity linkage operations to link extracted concepts to one another in a hierarchical knowledge graph specifying a functional relationship between the extracted concepts, to generate the first knowledge graph.

13. The computer program product of claim 11, wherein generating the one or more code entities comprises:

executing a computer code language processing of the received requirements specification data structure to extract code tokens from the existing code for the software product that correspond to functions of the existing code; and generating the one or more code entities based on the extracted code tokens, wherein the code entities comprise tags corresponding to the extracted code tokens.

14. The computer program product of claim 13, wherein the code tokens are extracted from at least one of code comments, function names, git commit descriptions, or issue tracking and project management tool identifiers.

15. The computer program product of claim 11, wherein linking selected code entities in the one or more code entities to selected function entities further comprises, for each selected function entity, of the selected function entities, and for each code entity linked to each selected function entity:

weighting a link between each selected function entity and the code entity based on at least one of a call depth in a hierarchical calling order of each selected function entity, a code size of a portion of code corresponding to the code entity, or a determined complexity of the portion of code corresponding to the code entity.

16. The computer program product of claim 15, wherein the weighting is based at least on the determined complexity of the portion of code corresponding to the code entity, and wherein the complexity is determined based on at least one of a number of variables in the portion of code, inclusion of code loop logic in the portion of code, or a number of other functions called by the portion of code.

17. The computer program product of claim 11, wherein the computer readable program further causes the computing device to execute, for a first function entity in the function entities specified in the first knowledge graph, a function similarity analysis with second function entities corresponding to the software product, wherein the function similarity analysis identifies a second function entity that has one or more linked second code entities having similar tags to first code entities linked to the first function entity at least in a common substructure between the first function entity and the second function entity.

18. The computer program product of claim 17, wherein the computer readable program further causes the computing device to weight a relationship similarity link between the first function entity and the second function entity based on a degree of similarity between the similar tags of the first code entities and the linked second code entities.

19. The computer program product of claim 18, wherein the regression scope knowledge graph output comprises a first portion that graphically represents the relationship similarity link between the function entities, and a second portion that graphically represents links between the function entities and their corresponding code entities.

20. An apparatus comprising:
a processor; and
a memory coupled to the processor, wherein the memory comprises instructions which, when executed by the processor, cause the processor to:
generate a first knowledge graph of a received requirements specification data structure specifying functional requirements for a software product;
generate, for function entities specified in the first knowledge graph, a first vector representation at least by executing a first computer encoding of textual content of the function entities into the first vector representation;
generate one or more code entities for existing code for the software product, wherein the code entities comprise features associated with portions of the existing code;
generate, for the one or more code entities, a second vector representation at least by executing a second computer encoding of textual content of the code entities into the second vector representation;
link selected code entities in the one or more code entities to selected function entities based on a vector similarity analysis between the first vector representation and the second vector representation; and
generate a regression scope knowledge graph output based on the linked code entities and the function entities, wherein the regression scope knowledge graph output depicts relationships between the function entities corresponding to the functional requirements with code entities corresponding to portions of existing code for the software product.

\* \* \* \* \*